United States Patent
You et al.

(10) Patent No.: US 9,031,566 B2
(45) Date of Patent: May 12, 2015

(54) HOME BASE STATION ACCESS METHOD, HOME BASE STATION SYSTEM AND HOME BASE STATION ACCESS POINT

(75) Inventors: Shilin You, Shenzhen (CN); Jiyan Cai, Shenzhen (CN); Lin Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 461 days.

(21) Appl. No.: 13/496,077

(22) PCT Filed: Jul. 21, 2010

(86) PCT No.: PCT/CN2010/075352
§ 371 (c)(1),
(2), (4) Date: Mar. 14, 2012

(87) PCT Pub. No.: WO2011/035643
PCT Pub. Date: Mar. 31, 2011

(65) Prior Publication Data
US 2012/0178466 A1 Jul. 12, 2012

(30) Foreign Application Priority Data
Sep. 27, 2009 (CN) .......................... 2009 1 0173978

(51) Int. Cl.
*H04W 72/00* (2009.01)
*H04W 60/00* (2009.01)
*H04W 84/04* (2009.01)

(52) U.S. Cl.
CPC ............ *H04W 60/00* (2013.01); *H04W 84/045* (2013.01)

(58) Field of Classification Search
USPC ....................................................... 455/450
See application file for complete search history.

(56) References Cited

U.S. PATENT DOCUMENTS

| | | | |
|---|---|---|---|
| 2009/0156213 A1* | 6/2009 | Spinelli et al. | 455/436 |
| 2012/0129497 A1* | 5/2012 | De Benedittis et al. | 455/411 |
| 2012/0163293 A1* | 6/2012 | Mildh et al. | 370/328 |
| 2014/0120911 A1* | 5/2014 | Kozuka et al. | 455/435.1 |

FOREIGN PATENT DOCUMENTS

| | | |
|---|---|---|
| CN | 101466125 A | 6/2009 |
| CN | 101500244 A | 8/2009 |
| CN | 101500281 A | 8/2009 |

OTHER PUBLICATIONS

International Search Report for PCT/CN2010/075352 dated Oct. 13, 2010.

\* cited by examiner

*Primary Examiner* — German J Viana Di Prisco
(74) *Attorney, Agent, or Firm* — Ling and Yang Intellectual Property (57) ABSTRACT

The present invention discloses a home NodeB access method comprising: during initialization, a home NodeB access point selecting a home NodeB gateway connected to one of core networks which the home NodeB access point has right to access as a serving home NodeB gateway; the home NodeB access point registering in the serving home NodeB gateway, registering user information with the serving home NodeB gateway after receiving a non-access layer message sent from a user equipment, and forwarding the non-access layer message to the serving home NodeB gateway; and the serving home NodeB gateway forwarding the non-access layer message to a core network corresponding to a network access identifier of the user equipment according to the identifier after receiving the non-access layer message; and the core network interacting with the user equipment to complete access of the user equipment; so as to achieve share of the home NodeB.

8 Claims, 8 Drawing Sheets

HOME BASE STATION ACCESS METHOD, HOME BASE STATION SYSTEM AND HOME BASE STATION ACCESS POINT

TECHNICAL FIELD

The present invention relates to a home NodeB access method, a home NodeB system and a home NodeB access point.

BACKGROUND OF THE RELATED ART

Home NodeB is a small base station with low power deployed in indoor places such as houses, offices, etc., and its main function is to provide higher service rate to users and reduce costs of high rate services while making up for defects of coverage of distributed cellular wireless communication systems. The advantages of the home NodeB is convenience, low output power, plug-and-play, etc.

Home NodeB systems almost can be applied in all mobile communication networks, such as CDMA1X and CDMA2000 networks using a series of standards of code division multiple access (CDMA for short) in the 3rd Generation Partnership Project 2 (3GPP2 for short), $2^{nd}$ Generation (2G) networks such as global system for mobile communications (GSM for short) in the 3rd Generation Partnership Project (3GPP for short), $3^{rd}$ Generation (3G) networks such as wideband code division multiple access (WCDMA for short) systems, and long term evolution (LTE) mobile communication networks of the all-Internet Protocol (IP for short) which almost all operators will choose to use in the future, as well as Worldwide Interoperability for Microwave Access (WiMAX for short) mobile communication networks which use almost the same modulation technology as the LTE systems.

Figure 1:
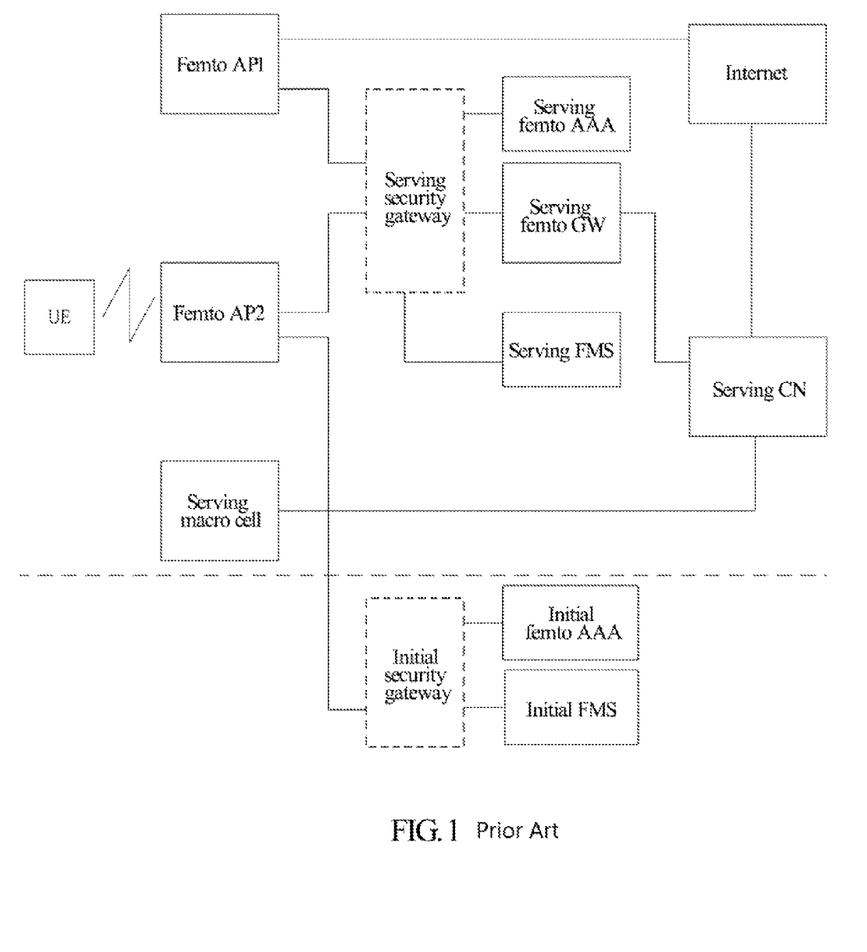
FIG. 1 is a boock diagram of an existing home NodeB system.

FIG. 1 is a block diagram of an existing home NodeB system.

As shown in FIG. 1, a user equipment (UE for short) can access a core network (CN for short) via a macro cell network to execute corresponding voice services, or execute data services by accessing to the Internet.

However, in order to solve coverage of a home indoor network, the UE can also access an IP backhaul network via a home NodeB access point, i.e., micro base station access point, also referred to as femto access point (Femto AP), access a home NodeB gateway, also referred to as femto gateway (Femto GW), at a service location via the IP backhaul network, and then access the core network at the service location to access to the Internet via the core network.

A security gateway (SeGW for short) at the service location can be provided between the Femto AP and the Femto GW at the service location (serving Femto GW for short), and the Femto AP establishes an IP security tunnel with the serving Femto GW via the security gateway at the service location (serving SeGW or serving security gateway for short).

A Femto authentication, authorization and accounting (AAA for short) system at the service location is connected to the serving security gateway to assist the Femto AP in establishing the IP security tunnel with the serving security gateway.

A home NodeB management server, referred to as femto management server (FMS for short), at the service location is connected to the Femto AP by the serving security gateway and used for configuring parameters of the Femto AP to ensure normal operation of the Femto AP. The Femto AP and the femto management server at the service location (serving FMS for short) configure the parameters using the home network protocol TR069 of a wideband forum.

The Femto AP can also directly access the Internet. In addition, according to different gateway types, the Femto GW can access three types of core networks, circuit switched (CS for short) network, IP Multimedia Core Network Subsystem (IMS for short) network and packet switched (PS for short) network, respectively.

Since both the Wimax and LTE networks are all-IP networks, home NodeBs of the Wimax and LTE networks access a core network via the IP networks, and the Femto GW may not be needed in the practical deployment.

The network elements at the service location in FIG. 1, which are network elements providing services to the user equipment finally, are mainly described above. Before initialization is completed, stored in the Femto AP may be relevant parameters of the network elements at an initial location, such as relevant parameters of a security gateway at the initial location (initial SeGW or initial security gateway for short), a Femto authentication, authorization and accounting system at the initial location (initial Femto AAA for short) and a Femto management server at the initial location (initial FMS for short). The network elements at initial location described above are used for finding the network elements at the service location during the initialization (see FIG. 2 for the particular procedure).

In addition, each network element at the service location in FIG. 1 may be the same network element as that at the initial location, i.e. the service location and the initial location are the same.

Figure 2:
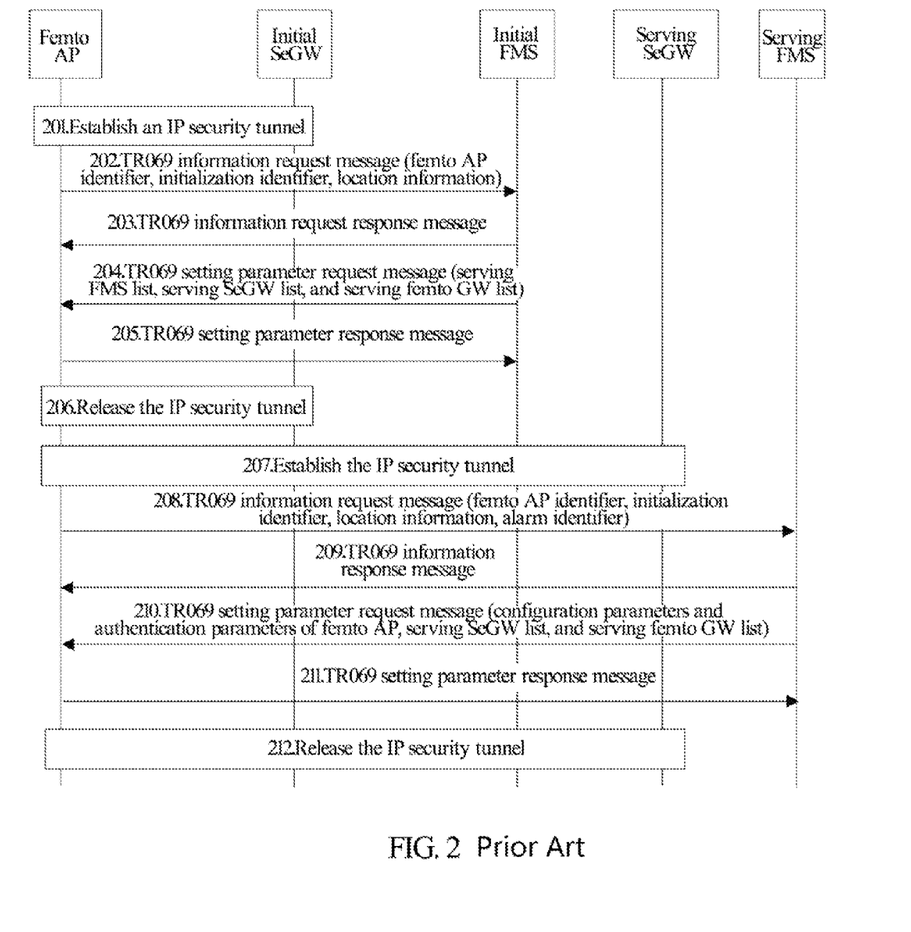
FIG. 2 is a flowchart of a method for initializing a Femto AP in the existing technology.

FIG. 2 is a flowchart of a method for initializing a Femto AP in the existing technology, in which the Femto AP acquires relevant information of a Femto gateway at a service location (serving Femto GW for short) and completes parameter configuration. As shown in FIG. 2, this procedure comprises the following steps.

At 201, the Femto AP establishes an IP security tunnel with an initial SeGW.

When the Femto AP establishes the IP security tunnel with the initial SeGW, an initial Femto AAA is required to authenticate the Femto AP, referring to relevant documents for the particular procedure.

At 202, the Femto AP sends a TR069 information request message carrying parameters such as an identifier of the Femto AP, location information and an initialization identifier to an initial FMS via the established IP security tunnel.

At 203, the initial FMS authenticates access right of the Femto AP, and returns a TR069 information request response message to the Femto AP upon success of the authentication.

At 204, the initial FMS sends a TR069 setting parameter request message carrying a list of serving FMSs (such as a list of IP addresses of serving FMSs) and also a list of serving SeGWs (such as a list of IP addresses of serving SeGWs) to the Femto AP to establish a new IP security tunnel between the Femto AP and the serving FMS. In addition, the message can also carry a list of serving Femto GWs (such as a list of IP addresses of serving Femto GWs).

At 205, the Femto AP acknowledges information sent by the initial FMS, and returns a TR069 setting parameter response message to the initial FMS after selecting a serving FMS, serving SeGW and serving Femto GW according to this information.

At 206, if the serving SeGW is different from the initial SeGW, then the IP security tunnel between the Femto AP and the initial SeGW is released.

If the serving SeGW is the initial SeGW, the IP security tunnel is not required to be reestablished between the Femto AP and the initial SeGW, and the IP security tunnel between the Femto AP and the initial SeGW is certainly not required to be released.

At 207, if the serving SeGW is different from the initial SeGW, then the Femto AP establishes the IP security tunnel with the initial SeGW.

When the IP security tunnel with the serving SeGW is established, the serving Femto AAA is required to authenticate the Femto AP, referring to relevant documents for the particular procedure.

At 208, the Femto AP sends a TR069 information request message carrying parameters such as the identifier of the Femto AP, an alarm identifier, the location information and initialization identifier to the serving FMS via the established IP security tunnel.

At 209, the serving FMS authenticates access right of the Femto AP, and returns a TR069 information request response message to the Femto AP upon success of the authentication.

At 210, the serving FMS sends a TR069 setting parameter request message to the Femto AP, the message carrying a list of serving SeGWs associated with the serving Femto GWs and configuration parameters and authentication parameters of the Femto AP.

In addition, if the list of serving Femto GWs is not carried in the TR069 setting parameter request message in step 204, then the TR069 setting parameter request message in this step is also required to carry the list of serving Femto GWs.

At 211, the Femto AP acknowledges information sent by the serving FMS, and returns a TR069 setting parameter response message to the serving FMS after selecting a serving SeGW and serving Femto GW according to this information.

At 212, if the serving SeGW selected in step 211 is different from the serving SeGW selected in step 205, then the Femto AP releases the IP security tunnel established in step 207.

Figure 3:
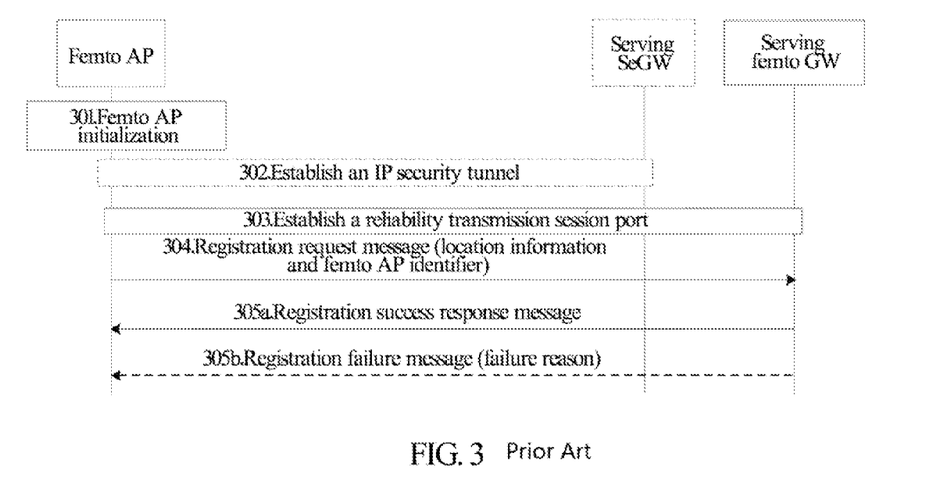
FIG. 3 is a flowchart of a method for registrating a Femto AP in the existing technology.

FIG. 3 is a flowchart of a method for registrating a Femto AP in the existing technology specifically comprising the following steps.

At 301, the Femto AP acquires configuration parameters and information of a serving Femto GW from a FMS using the procedure shown in FIG. 2.

At 302, the Femto AP establishes an IP security tunnel with a serving SeGW.

If in the initialization procedure shown in FIG. 2, the serving SeGW selected in step 211 is the same as the serving SeGW selected in step 205, then since the IP security tunnel has already been established between the Femto AP and the serving SeGW in step 207, then this step is not required to be performed.

At 303: the Femto AP establishes a reliability transmission session port with the serving Femto GW.

At 304, the Femto AP sends a registration request message containing location information of the Femto AP, an identifier of the Femto AP and execution parameters of the Femto AP to the serving Femto GW via the described session port.

The location information of the Femto AP described above may be one or more of:
  macro coverage information detected by the Femto AP (such as cellular information);
  geographical location information of the Femto AP (such as global positioning information); and
  Internet connection information of the Femto AP (such as an IP address of the Femto AP).

The identifier of the Femto AP is a globally unified and permanent identifier.

The execution parameters of the Femto AP may be cell information selected by the Femto AP.

At 305*a*, after receiving the registration request message sent by the Femto AP, a Femto GW performs access control on the Femto AP according to the information carried in this message (e.g., determines whether to allow the Femto AP to operate/register at this location based on the location information in the registration request message); and if the result of the access control is that the Femto GW allows the Femto AP to register, then it returns a registration success response message to the Femto AP.

At 305*b*, if the Femto GW rejects the registration request of the Femto AP (for example, this registration request is rejected due to congestion of the current network, the Femto AP being in a black list, the Femto AP initiating registration at an unauthorized location, etc.), the Femto GW returns a registration failure message carrying failure reasons to the Femto AP.

Figure 4:
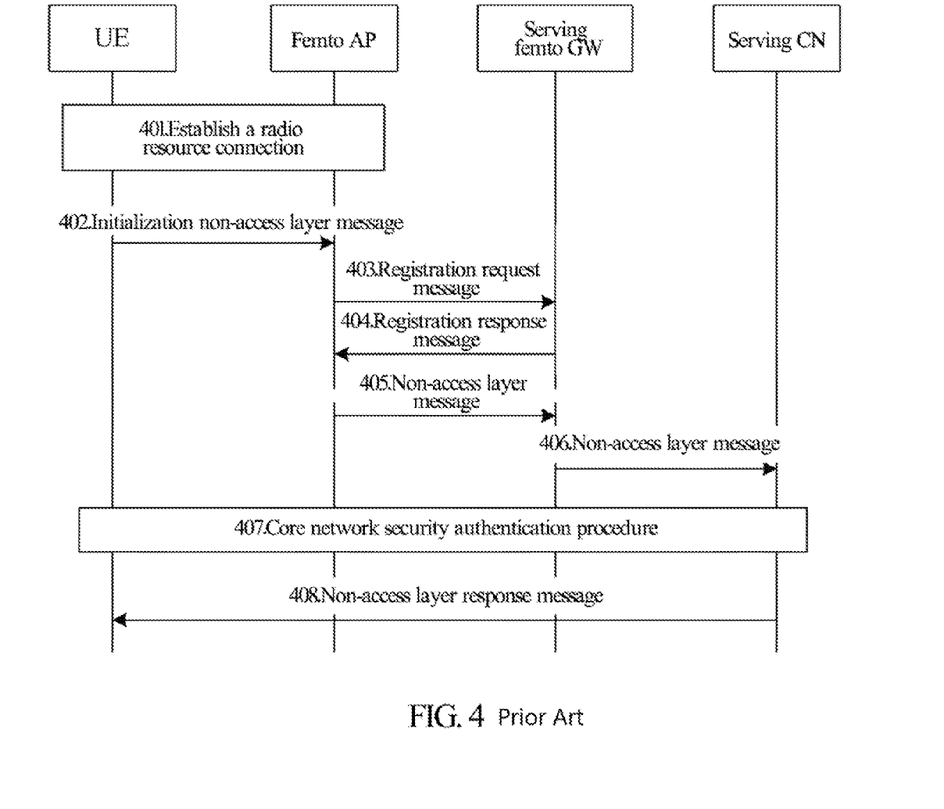
FIG. 4 is a flowchart of a method in which a UE registers with a legal core network via a legal Femto AP in the existing technoligy.

FIG. 4 is a flowchart of a method in which a UE registers with a legal core network via a legal Femto AP in the existing technology (i.e. a method in which the UE accesses the network) specifically comprising the following steps.

At 401, the UE establishes a radio resource connection with the Femto AP as a bearer of a signaling message or service data.

At 402, the UE triggers a registration process by sending an initialization non-access layer message (non-access layer message for short) to the Femto AP, and the non-access layer message may be an attachment message, a location update message, a service request message, etc.

At 403, after receiving the non-access layer message sent by the UE, the Femto AP finds that there is no context identifier information of a corresponding user (i.e. it finds that the user has not registered yet), and thus sends a registration request message to a serving Femto GW so as to register the user information with the serving Femto GW.

The described registration request message contains information such as registration type, an identifier of the UE (e.g., International Mobile Subscriber Identity (IMSI) of the UE) and an identifier of the Femto AP.

At 404, the serving Femto GW checks capability of the user accessing the Femto AP, and if the user is allowed to use resources provided by the Femto AP, then it accepts the registration, establishes user context and returns a registration response message carrying the context identifier information of the user to the Femto AP.

At 405, the Femto AP forwards the non-access layer message to the serving Femto GW.

At 406, the serving Femto GW does not process the non-access layer message forwarded by the Femto AP and directly transmits it to a serving core network transparently.

At 407, the serving core network authenticates security of the user according to the received non-access layer message.

At 408, if the security authentication is passed, then the core network side performs corresponding operations on the non-access layer message sent by the user, returns a non-access layer response message to the UE, and sends information of the core network side to the UE. The response message is transparently transmitted between the UE and the CN, and will not processed by both the Femto AP and serving Femto GW.

The existing home NodeB system and procedures of the initialization and registration of the Femto AP and the registration of the UE based on this system are described above.

There is a disadvantage in the existing home NodeB, i.e. one home NodeB can only access one core network, which means that users of one home NodeB usually can only be users of one operator network and users of another operator network cannot access this operator network unless a roaming protocol is subscribed between both operators.

However, usually there is no roaming protocol between two operators under the same coverage, which brings inconvenience to owners of home NodeBs. For example, there are three mobile operators in China, and all these three operators have their own IP backhaul networks which will be evolved to LTE networks in the future. If the three operators all deploy home NodeB systems, for an owner of one home NodeB, users accessing mobile operator networks using this home NodeB include family members and friends of the owner of the home NodeB or temporary visitors, they may belong to operators different from the owner of the home NodeB, and therefore they cannot access the mobile operator networks through this home NodeB. In addition, for enterprise level home NodeB users, in order for users of different operators to access the network, the enterprise needs to purchase home NodeBs of multiple different operators, which will cause resource and space waste.

CONTENT OF THE INVENTION

The technical problem to be solved by the present invention is to overcome defects of the existing technology and provide a home NodeB access method, a home NodeB system and a home NodeB access point which can provide access services for users of different operators.

In order to solve the above technical problem, the present invention provides a home NodeB access method comprising:

during initialization, a home NodeB access point selecting a home NodeB gateway connected to one of core networks which the home NodeB access point has right to access as a serving home NodeB gateway;

the home NodeB access point registering in the serving home NodeB gateway, registering user information with the serving home NodeB gateway after receiving a non-access layer message sent from a user equipment, and forwarding the non-access layer message to the serving home NodeB gateway; and the serving home NodeB gateway forwarding the non-access layer message to a core network corresponding to a network access identifier of the user equipment according to the identifier after receiving the non-access layer message; and the core network interacting with the user equipment to complete access of the user equipment;

so as to achieve share of the home NodeB.

In addition, the step of the home NodeB access point selecting the serving home NodeB gateway comprises:

the home NodeB access point sending a TR069 information request message containing share information to a Femto management server (FMS), the share information containing network access identifiers of the core networks which the home NodeB access point has right to access;

after receiving the TR069 information request message, the FMS selecting home NodeB gateways connected to the core networks which the home NodeB access point has right to access according to the share information and sending a TR069 setting parameter request message containing a list of the selected home NodeB gateways to the home NodeB access point; and after receiving the TR069 setting parameter request message, the home NodeB access point selecting a home NodeB gateway from the contained list of home NodeB gateways as the serving home NodeB gateway.

In addition, the step of the home NodeB access point selecting the serving home NodeB gateway comprises:

the home NodeB access point sending the TR069 information request message to FMSs corresponding to the core networks which home NodeB access point has right to access;

after receiving the TR069 information request message, each FMS sending the TR069 setting parameter request message containing the list of home NodeB gateways connected to the core networks to the home NodeB access point; and after receiving the TR069 setting parameter request message sent by each FMS, the home NodeB access point selecting a home NodeB gateway contained in each list of home NodeB gateways as the serving home NodeB gateway.

In addition, the FMS includes an initial FMS and a serving FMS; and the step of the home NodeB access point selecting the serving home NodeB gateway further comprises:

after receiving the TR069 information request message, the initial FMS selecting FMSs corresponding to the core networks which the home NodeB access point has right to access according to the share information and sending the TR069 setting parameter request message containing a list of the selected FMSs to the home NodeB access point; and after receiving the TR069 setting parameter request message sent by the initial FMS, the home NodeB access point selecting a FMS from the contained list of FMSs as the serving FMS.

In addition, the step of the home NodeB access point registering in the serving home NodeB gateway comprises:

the home NodeB access point sending a registration request message to the serving home NodeB gateway, the registration request message containing access right information of each of the core networks which the home NodeB access point has right to access; and after receiving the registration request message, the serving home NodeB gateway checking validity of the access right information, generating access capability information of the home NodeB access point according to check results, and sending a registration response message containing the access capability information to the home NodeB access point, the access capability information containing network access identifiers of core networks corresponding to the valid access right information.

In addition, after the home NodeB access point receives the non-access layer message and before the home NodeB access point registers the user information with the serving home NodeB gateway, the method further comprises:

the home NodeB access point performing access control on the user equipment according to the access capability information to determine whether to allow access of the user equipment.

The present invention further provides a home NodeB system comprising a user equipment, a home NodeB access point, a home NodeB gateway, and a core network; wherein the home NodeB access point is configured to, during initialization, select a home NodeB gateway connected to one of core networks which the home NodeB access point has right to access as a serving home NodeB gateway and register in the serving home NodeB gateway; register user information with the serving home NodeB gateway after receiving a non-access layer message sent from a user equipment, and forward the non-access layer message to the serving home NodeB gateway;

the serving home NodeB gateway is configured to forward the non-access layer message to a core network corresponding to a network access identifier of the user equipment according to the identifier after receiving the non-access layer message; and the core network is configured to interact with the user equipment to complete access of the user equipment after receiving the non-access layer message.

In addition, the system further includes a FMS.

The home NodeB access point is configured to select the serving home NodeB gateway by:

sending a TR069 information request message containing share information to the FMS, the share information containing network access identifiers of the core networks which the home NodeB access point has right to access; and selecting a home NodeB gateway from the contained list of home NodeB gateways as the serving home NodeB gateway after receiving a TR069 setting parameter request message.

The FMS is configured to, after receiving the TR069 information request message, select home NodeB gateways connected to the core networks which the home NodeB access point has right to access according to the share information and send a TR069 setting parameter request message containing a list of the selected home NodeB gateways to the home NodeB access point.

In addition, the system further comprises FMSs corresponding to the core networks.

The home NodeB access point is configured to select the serving home NodeB gateway by:

sending a TR069 information request message to the FMSs corresponding to the core networks which the home NodeB access point has right to access; and selecting a home NodeB gateway contained in each list of home NodeB gateways as the serving home NodeB gateway after receiving the TR069 setting parameter request message sent by each FMS.

The FMS is configured to, after receiving the TR069 information request message, send the TR069 setting parameter request message containing the list of home NodeB gateways connected to the core networks to the home NodeB access point.

In addition, the FMS includes an initial FMS and a serving FMS.

The initial FMS is configured to, after receiving the TR069 information request message, select FMSs corresponding to the core networks which the home NodeB access point has right to access according to the share information and send the TR069 setting parameter request message containing a list of the selected FMSs to the home NodeB access point.

The home NodeB access point is further configured to, after receiving the TR069 setting parameter request message sent by the initial FMS, select a FMS from the contained list of FMSs as the serving FMS.

The present invention further discloses a home NodeB access point configured to:

during initialization, select a home NodeB gateway connected to one of core networks which the home NodeB access point has right to access as a serving home NodeB gateway and register in the serving home NodeB gateway; and register user information with the serving home NodeB gateway after receiving a non-access layer message sent from a user equipment, and forward the non-access layer message to the serving home NodeB gateway;

the serving home NodeB gateway forwards the non-access layer message to a core network corresponding to a network access identifier of the user equipment according to the identifier such that the core network interacts with the user equipment according to the non-access layer message to complete access of the user equipment.

The home NodeB access point is configured to select the serving home NodeB gateway by:

sending a TR069 information request message containing share information to a femto management server (FMS), the share information containing network access identifiers of the core networks which the home NodeB access point has right to access; and selecting a home NodeB gateway from the contained list of home NodeB gateways as the serving home NodeB gateway after receiving a TR069 setting parameter request message.

After the TR069 information request message is received by the FMS, home NodeB gateways connected to the core networks which the home NodeB access point has right to access are selected according to the share information and the TR069 setting parameter request message containing a list of the selected home NodeB gateways is sent to the home NodeB access point.

The home NodeB access point is configured to, after receiving the TR069 setting parameter request message sent by the initial FMS, select a FMS from the contained list of FMSs as a serving FMS.

After the TR069 information request message is received by the FMS, FMSs corresponding to the core networks which the home NodeB access point has right to access are selected according to the share information and the TR069 setting parameter request message containing a list of the selected FMSs is sent to the home NodeB access point.

The home NodeB access point is configured to select the serving home NodeB gateway by:

sending a TR069 information request message to the FMSs corresponding to the core networks which the home NodeB access point has right to access; and selecting a home NodeB gateway contained in each list of home NodeB gateways as the serving home NodeB gateway after receiving the TR069 setting parameter request message sent by each FMS.

After the TR069 information request message is received by the FMS, the TR069 setting parameter request message containing the list of home NodeB gateways connected to the core networks is sent to the home NodeB access point.

In summary, in the present invention, the Femto AP selects a Femto GW connected to one of the core networks as the serving Femto GW which forwards the message sent by the user equipment to the corresponding core network, such that users of different operator networks can access the corresponding core network via the Femto AP, providing convenience for the users, and reducing the ownership cost of the owner of the Femto AP.

PREFERRED EMBODIMENTS OF THE PRESENT INVENTION

The core concept of the present invention is that during initialization, a home NodeB access point selects a home NodeB gateway connected to one of core networks which a home NodeB access point has right to access as a serving home NodeB gateway, and forwards a non-access layer message to the serving home NodeB gateway after receiving the non-access layer message sent by the user equipment; and the serving home NodeB gateway forwards the non-access layer message to a core network corresponding to a network access identifier (such as mobile network access identifier) of the user equipment according to the identifier.

The present invention will be described in detail below in conjunction with the accompanying drawings and embodiments.

Figure 5:
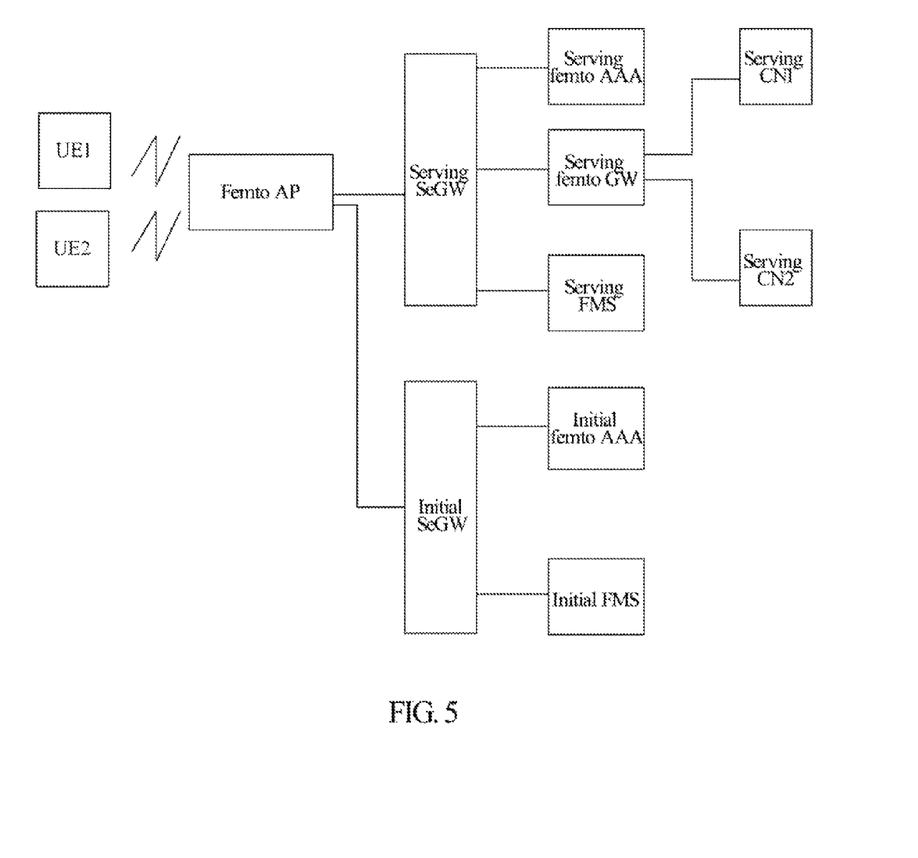
FIG. 5 is a block diagram of a home NodeB system according to an embodiment of the present invention.

FIG. 5 is a block diagram of a home NodeB system according to an embodiment of the present invention. As shown in FIG. 5, the system comprises a Femto AP, a serving SeGW, a serving Femto AAA, a serving FMS, a serving CN1 and a serving CN2, a serving Femto GW connected to both the serving CN1 and serving CN2, and user equipments of different operators (such as user equipment UE1 of the serving CN1 and user equipment UE2 of the serving CN2). In addition, when a service location is different from an initial location, the system further comprises an initial SeGW, an initial Femto AAA, and an initial FMS.

The main difference between functions realized by the home NodeB system shown in FIG. 5 and those of the existing home NodeB system is that user equipments of different operator networks can access the corresponding serving core networks (core network for short) via a Femto AP and Femto GW.

In order to achieve the above described function, the owner of the Femto AP can apply for access right from a plurality of operators according to requirements and stores share information locally, with the share information being mobile network access identifiers and access right information of core networks which the Femto AP has right to access and the address of an initial FMS. During initialization of the Femto AP, the Femto AP selects a Femto GW connected to one of the core networks which it has right to access as the serving Femto GW according to the share information and sends a non-access layer message sent by the UE to the serving Femto GW during registration of the UE.

The difference between the serving Femto GW in FIG. 5 and a serving Femto GW in the existing technology is that the former is connected to a plurality of core networks, and sends a non-access layer message of the UE to the corresponding core network according to a mobile network access identifier of the UE to complete registration of the UE.

In addition, the serving Femto GW in FIG. 5 can also generate access capability information of the Femto AP according to share information of the Femto AP during the registration of the Femto AP and send the access capability information to the Femto AP for access control.

The FMS in FIG. 5 (including an initial FMS and a serving FMS) can be shared or separated, i.e. the FMS (including the initial FMS and the serving FMS) can be shared by a plurality of core networks or FMSs corresponding to the core networks respectively.

According to different setting manners (shared or separated) of the FMS (including the initial FMS and the serving FMS), the Femto AP can select the serving Femto GW in different manners and acquire configuration parameters from the serving FMS. The particular manner will be described in the following.

Functions of the initial SeGW, serving SeGW, initial Femto AAA and serving Femto AAA in FIG. 5 are the same as those of the corresponding network elements in the existing technology and will not be repeated herein.

A method for sharing a home NodeB based on the system shown in FIG. 5 will be described in detail below and comprises a method for initializing a Femto AP, a method for registering of the Femto AP, and a method for registering a UE.

Figure 6:
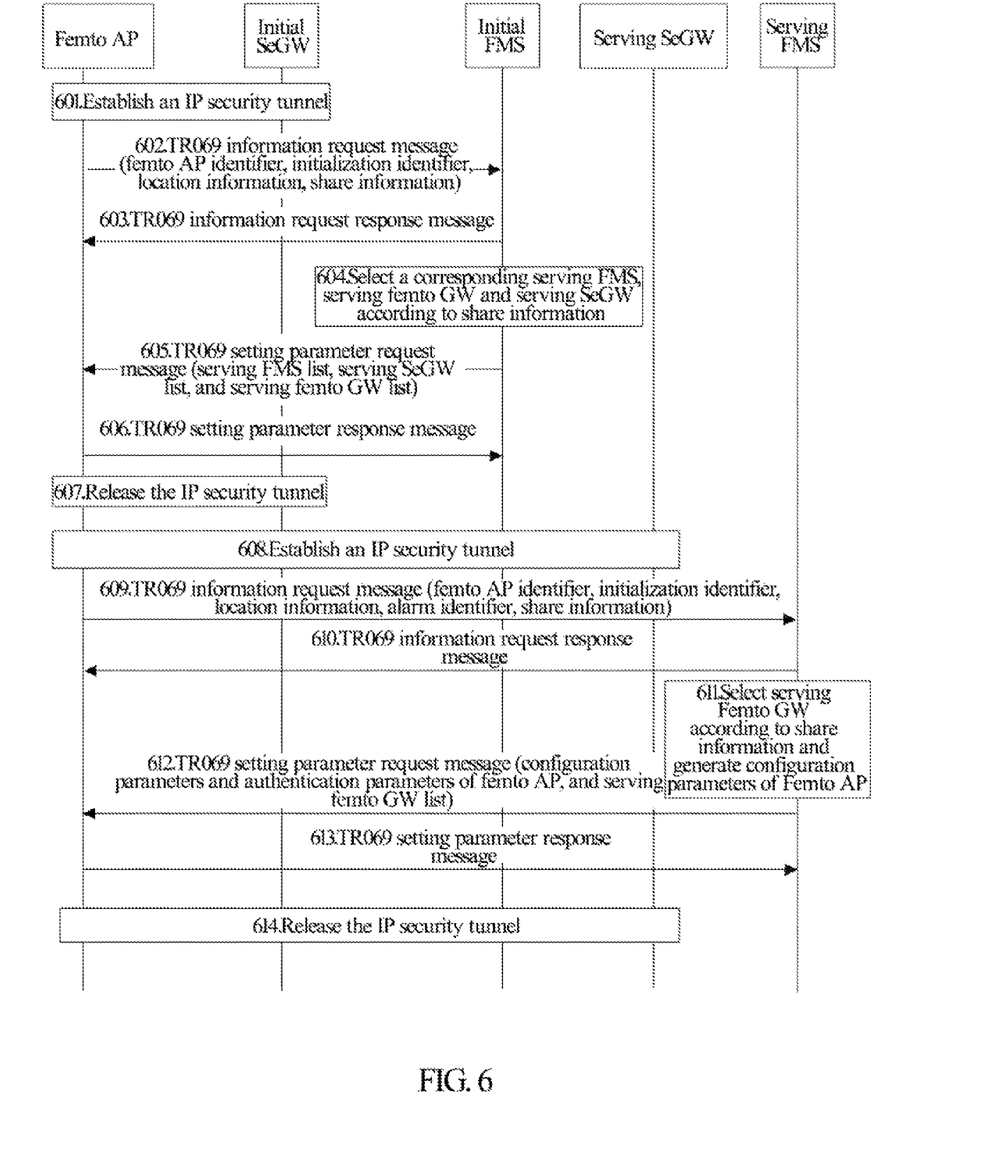
FIG. 6 is a flowchart of the first method for initializing a Femto AP in the system shown in FIG. 5.

FIG. 6 is a flowchart of the first method for initializing a Femto AP in the system shown in FIG. 5, in which a serving FMS is shared by a plurality of operators (i.e. a plurality of serving CNs share one serving FMS). As shown in FIG. 6, the method comprises the following steps.

At 601, after being powered up, the Femto AP establishes an IP security tunnel with an initial SeGW.

When the Femto AP establishes the IP security tunnel with the initial SeGW, an initial Femto AAA is required to authenticate the Femto AP, referring to relevant documents for the particular procedure.

At 602, the Femto AP sends a TR069 information request message carrying an identifier the Femto AP, location information, an initialization identifier, share information to an initial FMS via the established IP security tunnel.

The share information described above is access right information purchased by the owner of the Femto AP from the an operator, such as authentication card information, and also contains mobile network access identifiers of the core networks which the Femto AP can access.

At 603, the initial FMS authenticates access right of the Femto AP, and returns a TR069 information request response message to the Femto AP upon success of the authentication.

At 604, the initial FMS selects a corresponding serving FMS, serving SeGW and serving Femto GW according to the share information of the Femto AP and practical network deployment situations.

The serving Femto GW selected by the initial FMS is connected to one of the core networks identified in the share information.

At 695, the initial FMS sends a TR069 setting parameter request message carrying a list of serving FMSs (such as a list of IP addresses or a list of identifiers of serving FMSs) and also a list of serving SeGWs (such as a list of IP addresses or a list of identifiers of serving SeGWs) to the Femto AP to establish a new IP security tunnel between the Femto AP and the serving FMS. In addition, the message can also carry a list of serving Femto GWs (such as a list of IP addresses or a list of identifiers of serving Femto GWs).

At 606, the Femto AP acknowledges information sent by the initial FMS, and returns a TR069 setting parameter response message to the initial FMS after selecting the serving FMS, serving SeGW and serving Femto GW according to this information.

At 607, if the serving SeGW is different from the initial SeGW, then the IP security tunnel between the Femto AP and the initial SeGW is released.

If the serving SeGW is the initial SeGW, the IP security tunnel is not required to be reestablished between the Femto AP and the initial SeGW, and the IP security tunnel between the Femto AP and the initial SeGW is certainly not required to be released.

At 608, if the serving SeGW is different from the initial SeGW, then the Femto AP establishes the IP security tunnel with the initial SeGW.

When the IP security tunnel with the serving SeGW is established, the serving Femto AAA is required to authenticate the Femto AP, referring to relevant documents for the particular procedure.

At 609, the Femto AP sends a TR069 information request message carrying parameters such as the identifier of the Femto AP, an alarm identifier, the location information, initialization identifier and share information of the Femto AP to the serving FMS via the established IP security tunnel.

At 610, the serving FMS authenticates access right of the Femto AP, and returns a TR069 information request response message to the Femto AP upon success of the authentication.

At 611, the serving FMS selects a corresponding serving Femto GW according to the share information of the Femto AP and generates configuration parameters of the Femto AP.

The serving Femto GW selected by the serving FMS is connected to one of the core networks identified in the share information.

At 612, the serving FMS sends a TR069 setting parameter request message to the Femto AP, the message carrying a list of serving SeGWs associated with the serving Femto GWs and the configuration parameters and authentication parameters of the Femto AP.

In addition, if the list of serving Femto GWs is not carried in the TR069 setting parameter request message in step 605, then the TR069 setting parameter request message in this step is also required to carry the list of serving Femto GWs.

At 613, the Femto AP acknowledges information sent by the serving FMS, and returns a TR069 setting parameter response message to the serving FMS after selecting a serving SeGW and serving Femto GW according to this information.

At 614, if the serving SeGW selected in step 613 is different from the serving SeGW selected in step 606, then the Femto AP releases the IP security tunnel established in step 608.

It should be noted that if the initial FMS and the serving FMS are the same, then steps 601 to 607 can be omitted.

Figure 7:
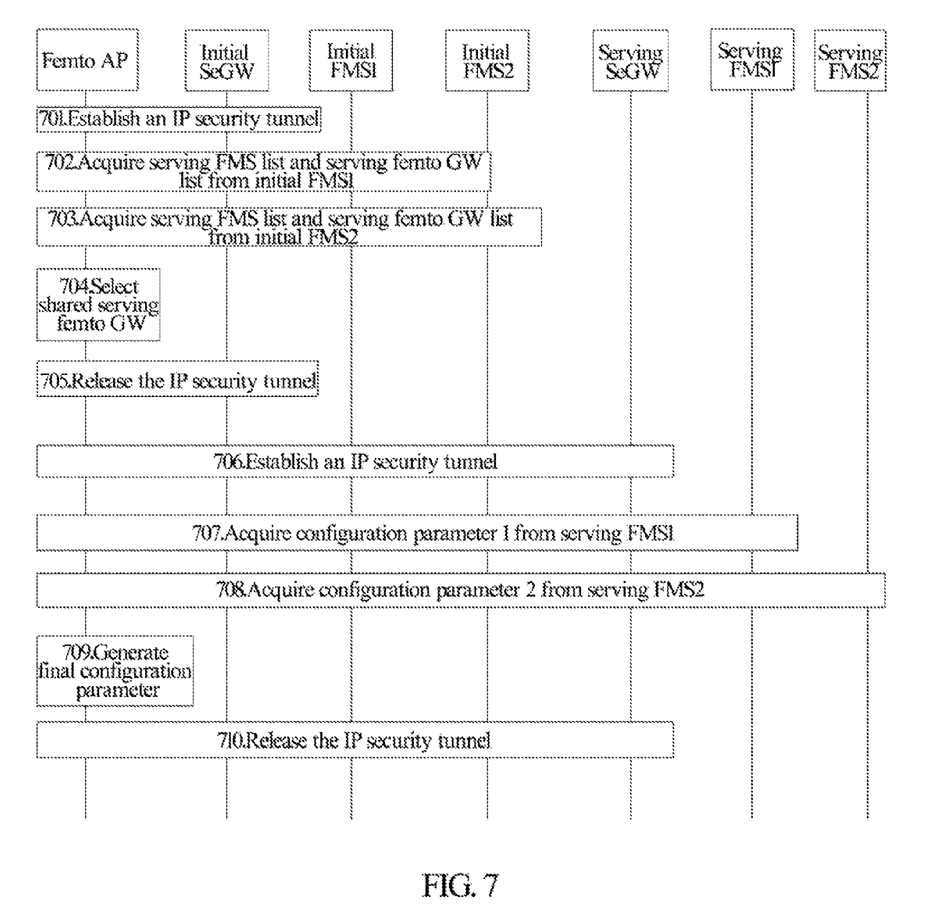
FIG. 7 is a flowchart of the second method for initializing a Femto AP in the system shown in FIG. 5.

FIG. 7 is a flowchart of the second method for initializing a Femto AP in the system shown in FIG. 5, in which each operator has its own serving FMS (i.e. each serving CN corresponds to one serving FMS). As shown in FIG. 7, the method comprises the following steps:

At 701, after being powered up, the Femto AP establishes an IP security tunnel with an initial SeGW.

At 702, the Femto AP acquires a corresponding list of serving FMSs, list of serving SeGWs and list of serving Femto GWs from initial FMS1 according to share information via the established IP security tunnel, and selects serving FMS1 from the list of serving FMSs, the particular procedure is the same as steps 202 to 205.

At 703, the Femto AP acquires a corresponding list of serving FMSs, list of serving SeGWs and list of serving Femto GWs from initial FMS2 according to the share information via the established IP security tunnel, and selects serving FMS2 from the list of serving FMSs, the particular procedure is the same as steps 202 to 205.

In this embodiment, the share information of the Femto AP also contains address information or identifier information of initial FMSs (initial FMS1 and initial FMS2 in this embodiment) corresponding to different serving core networks (serving CN1 and serving CN2 in this embodiment).

At 704, the Femto AP selects a Femto GW owned commonly by the list of serving Femto GWs acquired in steps 702 and the list of serving Femto GWs acquired in steps 703 as a shared serving Femto GW (which is connected to serving CN1 and serving CN2), and selects a corresponding serving SeGW.

At 705, if the selected serving SeGW is different from the initial SeGW, then the IP security tunnel between the Femto AP and the initial SeGW is released.

If the serving SeGW is the initial SeGW, the IP security tunnel is not required to be reestablished between the Femto AP and the initial SeGW, and the IP security tunnel between the Femto AP and the initial SeGW is certainly not required to be released.

At 706, if the serving SeGW is different from the initial SeGW, then the Femto AP establishes the IP security tunnel with the initial SeGW.

It should be noted that if serving SeGWs corresponding to serving FMS1 and serving FMS2 are different, two IP security tunnels are required to be established in this step separately.

At 707, the Femto AP acquires configuration parameter 1 of the Femto AP, the list of serving SeGWs and optionally the list of serving Femto GWs from serving FMS1 via the established IP security tunnel, and the particular procedure is the same as steps 208 to 211.

At 708, the Femto AP acquires configuration parameter 2 of the Femto AP, the list of serving SeGWs and optionally the list of serving Femto GWs from serving FMS2 via the established IP security tunnel, and the particular process is the same as steps 208 to 211.

At 709, the Femto AP generates the final Femto AP configuration parameter according to configuration parameter 1 acquired from serving FMS1 and configuration parameter 2 acquired from serving FMS2.

Since configuration parameter 1 and configuration parameter 2 may be different, the Femto AP can generate the final Femto AP configuration parameter using the following strategies: the Femto AP generates a single user side parameter, such as an identifier of the Femto AP and frequency, according to configuration parameter 1 and configuration parameter 2, and generates different network side parameters for different operators, such as routing area, or location area, or tracking area, according to configuration parameter 1 and configuration parameter 2.

In addition, if both serving FMS1 and serving FMS2 return the list of serving SeGWs and the list of serving Femto GWs, the Femto AP is also required to select a Femto GW therefrom as the shared serving Femto GW (which is connected to serving CN1 and serving CN2) and select a corresponding serving SeGW.

At 710, if the serving SeGW selected in step 709 is different from the serving SeGW selected in step 704, then the Femto AP releases the IP security tunnel established in step 706.

It should be noted that if initial FMS1 and initial FMS2 are the same as serving FMS1 and serving FMS2 respectively, then steps 701 to 705 can be omitted.

Figure 8:
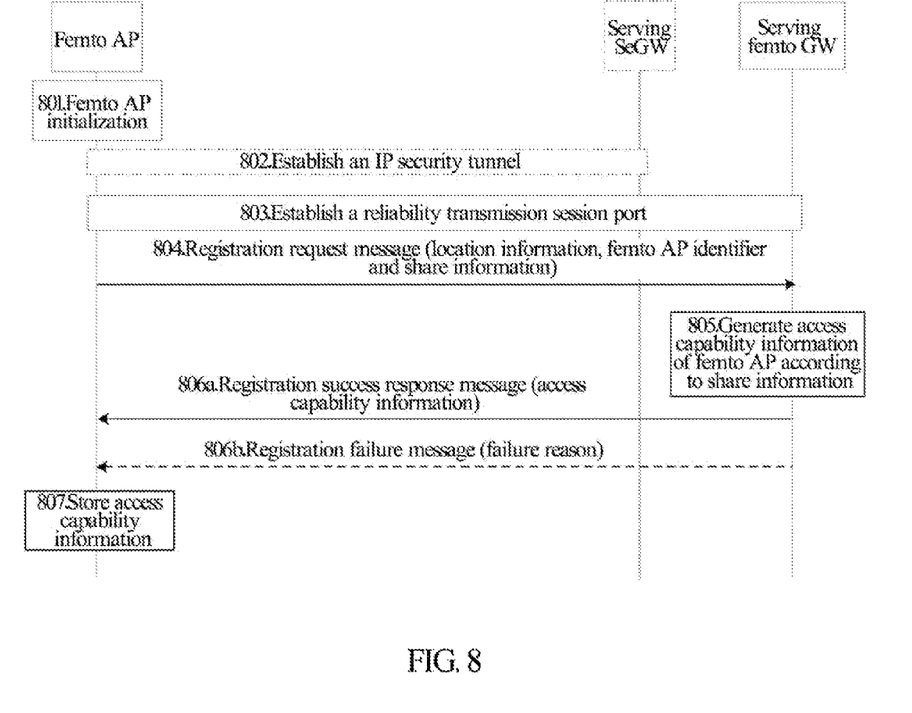
FIG. 8 is a flowchart of a method for registering a Femto AP in the system shown in FIG. 5.

FIG. 8 is a flowchart of a method for registering a Femto AP in the system shown in FIG. 5. As shown in FIG. 8, the method comprises the following steps.

At 801, the Femto AP acquires configuration parameters, information of a serving SeGW and serving Femto GW from a FMS using the method shown in FIG. 6 or 7.

At 802, the Femto AP establishes an IP security tunnel with the serving SeGW.

If in the procedure shown in FIG. 6 or 7, the Femto AP has already established an IP security tunnel with the serving SeGW, then this step can be omitted.

At 803, the Femto AP establishes a reliability transmission session port with serving Femto GW.

At 804, the Femto AP sends a registration request message containing location information of the Femto AP, an identifier of the Femto AP, execution parameters of the Femto AP and share information of the Femto AP to the serving Femto GW via the session port.

At 805, after receiving the above registration request message, the serving Femto GW generates access capability information of the Femto AP according to the share information contained in this message.

The access capability information described above is used for identifying operator networks which the Femto AP can access.

When generating the access capability information, the serving Femto GW needs to check validity of access right in the share information of the Femto AP, delete mobile network access identifiers of core networks whose access right has expired (invalid), and include mobile network access identifiers of core networks whose access right is still valid into the access capability information of the Femto AP.

At 806a, the serving Femto GW performs access control on the Femto AP according to information carried in the registration request message (e.g., determines whether to allow the Femto AP to operate/register at this location according to the location information of the Femto AP in the registration request message); and if the result of access control is that the Femto GW allows the Femto AP to register, return a registration success response message to the Femto AP, the message carrying the access capability information of the Femto AP.

At 806b, if the serving Femto GW rejects the registration request of the Femto AP (for example, this registration request is rejected due to congestion of the current network, the Femto AP being on a black list, the Femto AP initiating registration at an unauthorized location, etc.), the Femto GW returns a registration failure response message carrying failure reasons to the Femto AP, and the present procedure ends.

At 807, if a registration success response message is received, then the Femto AP stores the access capability information contained in this message.

Figure 9:
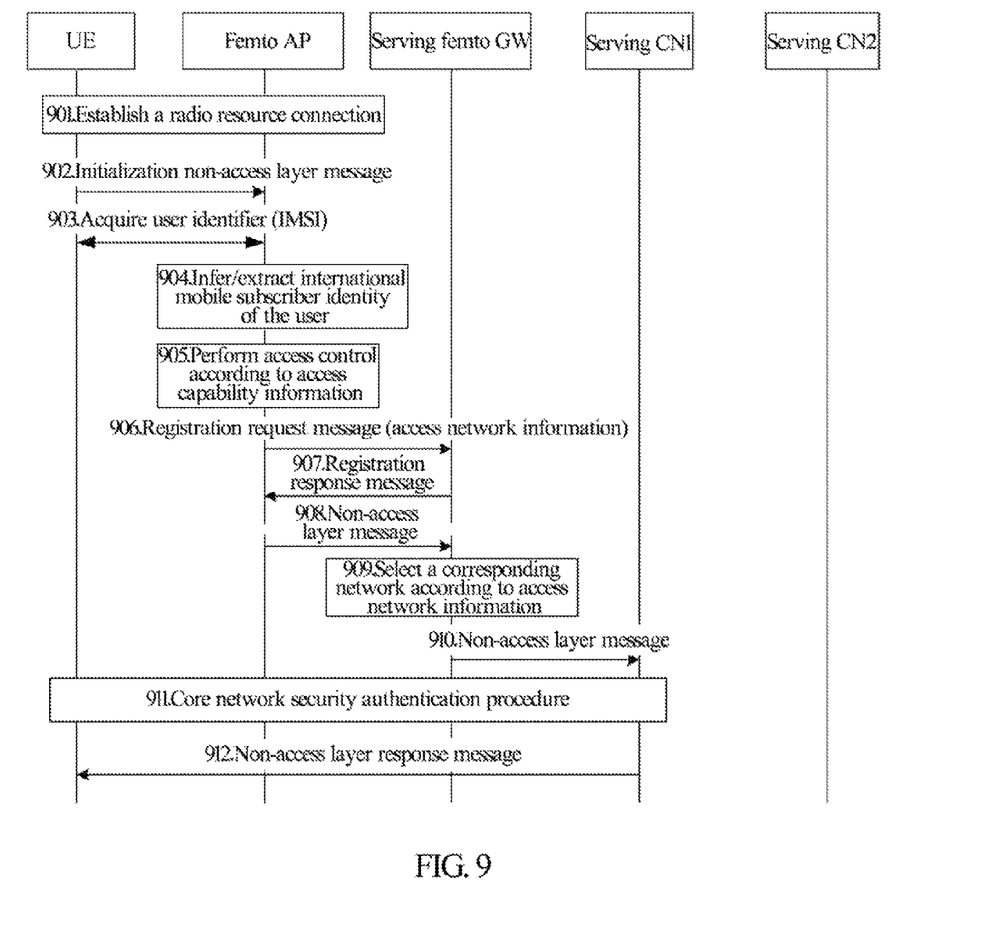
FIG. 9 is a flowchart of a method in which a UE registers with a legal core network via a legal Femto AP in the system shown in FIG. 5.

FIG. 9 is a flowchart of a method a UE registers with a legal core network via a legal Femto AP in the system shown in FIG. 5 (i.e. a method in which the UE accesses the core network). As shown in FIG. 9, the method comprises the following steps.

At 901, the UE establishes a radio resource connection with the Femto AP as a bearer of a signaling message or service data.

At 902, the UE triggers a registration process by sending an initialization non-access layer message to the Femto AP, and the initialization non-access layer message may be an attachment message, a location update message, a service request message, etc.

At 903, if an identifier of a user carried in the described non-access layer message is a temporary identifier of the user and a mobile network access identifier of the user is not carried in the signaling message for establishing the radio resource connection in step 901, then the Femto AP interacts with the user equipment to acquire an International Mobile Subscriber Identity of the user.

At 904, the Femto AP infers the mobile network access identifier of the user according to the International Mobile Subscriber Identity of the user or directly extracts the mobile network access identifier carried in the signaling message for establishing the radio resource connection.

At 905, the Femto AP performs access control according to the mobile network access identifier of the user and its own access capability information to determine whether to allow access of the user.

At 906, if the Femto AP allows access of the user and there is no context identifier information of the user locally (i.e. the corresponding user has not registered), then the Femto AP sends a registration request message to a serving Femto GW selected during initialization so as to register user information with the serving Femto GW.

The registration request message contains information, such as registration type, an identifier of the user (such as International Mobile Subscriber Identity (IMSI) of the UE), an identifier of the Femto AP, etc. In addition, this message can also contain the mobile network access identifier of the UE.

At 907, the serving Femto GW checks the capability of the user accessing the Femto AP, and if the user is allowed to use resources provided by the Femto AP, accepts the registration, and establishes user context and returns a registration success response message carrying the context identifier information of the user to the Femto AP.

At 908, the Femto AP forwards the non-access layer message to the serving Femto GW.

If the mobile network access identifier of the user is not carried in the registration request message in step 906, then it is carried in the message in this step.

At 909, the Femto GW selects a corresponding core network (which can also be referred to as target core network, such as serving CN1) according to the mobile network access identifier of the user.

The Femto GW can also infer the mobile network access identifier of the user according to the identifier of the user in the registration request message in step 906.

At 910, the Femto GW forwards the non-access layer message to the serving core network (such as serving CN1) selected in step 909.

At 911, the serving core network authenticates security of the user according to the received non-access layer message.

At 912, if the security authentication is passed, then the core network side performs corresponding operations on the non-access layer message sent by the user, returns a non-access layer response message to the UE, and sends information of the core network side to the UE. The response message described above is transparently transmitted between the UE and the CN, and the Femto AP and serving Femto GW do not process this message.

The above description is only the embodiments of the present invention and is not intended to limit the present invention. Various modifications and variations to the present invention may be made by those skilled in the art. Any modification, equivalent substitution and variation made within the spirit and principle of the present invention should be covered in the scope of the appended claims of the present invention.

INDUSTRIAL APPLICABILITY

In the present invention, the Femto AP selects a Femto GW connected to one of the core networks as the serving Femto GW which forwards the message sent by the user equipment to the corresponding core network, such that users of different operator networks can access the corresponding core network via the Femto AP, providing convenience for the users, and reducing the ownership cost of the owner of the Femto AP.

What we claim is:

1. A home NodeB access method comprising:

during initialization, a home NodeB access point selecting a home NodeB gateway connected to multiple core networks which the home NodeB access point has right to access as a serving home NodeB gateway;

the home NodeB access point registering in the serving home NodeB gateway, registering user information with the serving home NodeB gateway after receiving a non-access layer message sent from a user equipment, and forwarding the non-access layer message to the serving home NodeB gateway; and the serving home NodeB gateway forwarding the non-access layer message to one of the multiple core networks which corresponds to a network access identifier of the user equipment according to the identifier after receiving the non-access layer message; and said one of the core networks interacting with the user equipment to complete access of the user equipment;

so as to achieve share of the home NodeB; wherein the step of the home NodeB access point selecting the serving home NodeB gateway comprises one of following two ways:

way one: the home NodeB access point sending a TR069 information request message containing share information to a Femto Management Sever (FMS), after receiving the TR069 information request message, the FMS selecting home NodeB gateways connected to each of the multiple core networks which the home NodeB access point has right to access according to the share information, and sending a TR069 setting parameter request message containing a list of the selected home NodeB gateways connected to each of the multiple core networks to the home NodeB access point; and after receiving the TR069 setting parameter request message, the home NodeB access point selecting a home NodeB gateway from the contained list of the selected home NodeB gateways as the serving home NodeB gateway; or way two: the home NodeB access point sending the TR069 information request message to each FMS corresponding to one of the multiple core networks which the home NodeB access point has right to access, respectively;

after receiving the TR069 information request message, said each FMS sending the TR069 setting parameter request message containing a list of home NodeB gateways connected to the multiple core networks to the home NodeB access point, respectively; and after receiving the TR069 setting parameter request message sent by said each FMS, the home NodeB access point selecting a home NodeB gateway contained in each list of the home NodeB gateways connected to the multiple core network as the serving home NodeB gateway.

2. The method according to claim 1, wherein in way one:

the FMS includes an initial FMS and a serving FMS; and the step of the home NodeB access point selecting the serving home NodeB gateway further comprises:

after receiving the TR069 information request message, the initial FMS selecting FMSs corresponding to the multiple core networks which the home NodeB access point has right to access according to the share information, and sending the TR069 setting parameter request message containing a list of the selected FMSs to the home NodeB access point; and after receiving the TR069 setting parameter request message sent by the initial FMS, the home NodeB access point selecting a FMS from the contained list of FMSs as the serving FMS.

3. The method according to claim 1, wherein the step of the home NodeB access point registering in the serving home NodeB gateway comprises:

the home NodeB access point sending a registration request message to the serving home NodeB gateway, the registration request message containing access authority information of each of the multiple core networks which the home NodeB access point has right to access; and after receiving the registration request message, the serving home NodeB gateway checking validity of the access authority information, generating access capability information of the home NodeB access point according to check results, and sending a registration response message containing the access capability information to the home NodeB access point, the access capability information containing network access identifiers of the multiple core networks corresponding to the valid access authority information.

4. The method according to claim 3, wherein after the home NodeB access point receives the non-access layer message and before the home NodeB access point registers the user information with the serving home NodeB gateway, the method further comprises:

the home NodeB access point performing access control on the user equipment according to the access capability information to determine whether to allow access of the user equipment.

5. A home NodeB system comprising a user equipment, a home NodeB access point, a home NodeB gateway, and multiple core networks; wherein the home NodeB access point is configured to, during initialization, select a home NodeB gateway connected to multiple core networks which the home NodeB access point has right to access as a serving home NodeB gateway and register in the serving home NodeB gateway; register user information with the serving home NodeB gateway after receiving a non-access layer message sent from a user equipment, and forward the non-access layer message to the serving home NodeB gateway;

the serving home NodeB gateway is configured to forward the non-access layer message to one of the core networks which corresponds to a network access identifier of the user equipment according to the identifier after receiving the non-access layer message; and the multiple core networks are configured to connect to the home Node B gateway, when one of the multiple core networks receives the non-access layer message sent from the serving home Node B gateway, said one of the core networks is configured to interact with the user equipment to complete access of the user equipment; wherein the system further comprises one of following two configurations:

configuration one: —the system further comprises a Femto Management Server (FMS);

the home NodeB access point is configured to select the serving home NodeB gateway by:

sending a TR069 information request message containing share information to the FMS, the share information containing network access identifiers of the multiple core networks which the home NodeB access point has right to access; and selecting a home NodeB gateway from a contained list of home NodeB gateways as the serving home NodeB gateway after receiving a TR069 setting parameter request message; and the FMS is configured to, after receiving the TR069 information request message, select home NodeB gateways connected to the multiple core networks which the home NodeB access point has right to access according to the share information and send a TR069 setting parameter request message containing a list of the selected home NodeB gateways to the home NodeB access point; or, configuration two: the system further comprises FMSs corresponding to the multiple core networks respectively;

the home NodeB access point is configured to select the serving home NodeB gateway by:

sending a TR069 information request message to each of the FMSs corresponding to the core networks which the home NodeB access point has right to access, respectively; and selecting a home NodeB gateway contained in each list of home NodeB gateways as the serving home NodeB gateway after receiving the TR069 setting parameter request message sent by each of the FMSs;

said each of the FMSs is configured to, after receiving the TR069 information request message, send the TR069 setting parameter request message containing the list of home NodeB gateways connected to the multiple core networks to the home NodeB access point respectively.

6. The system according to claim 5, wherein in configuration one:

the FMS includes an initial FMS and a serving FMS;

the initial FMS is further configured to, after receiving the TR069 information request message, select FMSs corresponding to the multiple core networks which the home NodeB access point has right to access according to the share information, and send the TR069 setting parameter request message containing a list of the selected FMSs to the home NodeB access point; and the home NodeB access point is further configured to, after receiving the TR069 setting parameter request message sent by the initial FMS, select a FMS from the contained list of FMSs as the serving FMS.

7. A home NodeB access point configured to:

during initialization, select a home NodeB gateway connected to multiple core networks which the home NodeB access point has right to access as a serving home NodeB gateway and register in the serving home NodeB gateway; and register user information with the serving home NodeB gateway after receiving a non-access layer message sent from a user equipment, and forward the non-access layer message to the serving home NodeB gateway; and wherein the serving home NodeB gateway forwards the non-access layer message to one of the multiple core networks which corresponds to a network access identifier of the user equipment according to the identifier such that said one of the multiple core networks interacts with the user equipment according to the non-access layer message to complete access of the user equipment; wherein the home NodeB access point is configured to select the serving home NodeB gateway by one of following two modes:

mode one: sending a TR069 information request message containing share information to a Femto Management Server (FMS), the share information containing network access identifiers of the multiple core networks which the home NodeB access point has right to access; and selecting a home NodeB gateway from the contained list of home NodeB gateways as the serving home NodeB gateway after receiving a TR069 setting parameter request message; and after the TR069 information request message is received by the FMS, the home NodeB gateways connected to the multiple core networks which the home NodeB access point has right to access are selected according to the share information, and the TR069 setting parameter request message containing a list of the selected home NodeB gateways is sent to the home NodeB access point; or mode two: sending a TR069 information request message to the FMSs corresponding to the multiple core networks which the home NodeB access point has right to access respectively; and selecting a home NodeB gateway contained in each list of home NodeB gateways as the serving home NodeB gateway after receiving the TR069 setting parameter request message sent by each of the FMSs respectively; and after the TR069 information request message is received by each of the FMSs, the TR069 setting parameter request message containing the list of home NodeB gateways connected to the multiple core networks is sent to the home NodeB access point respectively.

8. The home NodeB access point according to claim 7, wherein in mode one: the home NodeB access point is configured to, after receiving the TR069 setting parameter request message sent by the initial FMS, select a FMS from the contained list of FMSs as a serving FMS; and after the TR069 information request message is received by the initial FMS, FMSs corresponding to the multiple core networks which the home NodeB access point has right to access respectively are selected according to the share information, and the TR069 setting parameter request message containing a list of the selected FMSs is sent to the home NodeB access point.

* * * * *